S. S. Ulrey,

Churn.

No. 95,167. Patented Sep. 21, 1869.

WITNESSES.
E E Gibson
Jas Nocquet

INVENTOR.
S S Ulrey
By his Attorney
G L Chapin

United States Patent Office.

STEPHEN S. ULREY, OF NORTH MANCHESTER, INDIANA.

Letters Patent No. 95,167, dated September 21, 1869.

IMPROVEMENT IN CHURNS.

The Schedule referred to in these Letters Patent and making part of the same.

To all whom it may concern:

Be it known that I, STEPHEN S. ULREY, of North Manchester, in the county of Wabash, and State of Indiana, have invented an Improvement in Churns; and I do hereby declare that the following is a full, clear, and exact description thereof, which will enable those skilled in the art to make and use the same, reference being had to the accompanying drawings, and letters marked thereon, making a part of this description, in which—

Figure 1:
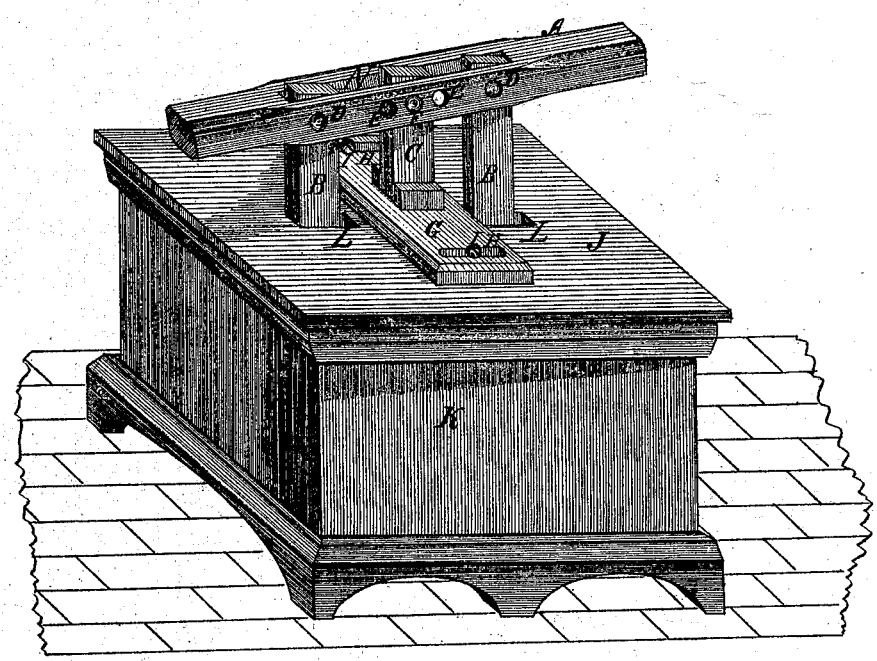

Figure 1 is a perspective representation of my invention.

Figure 2:
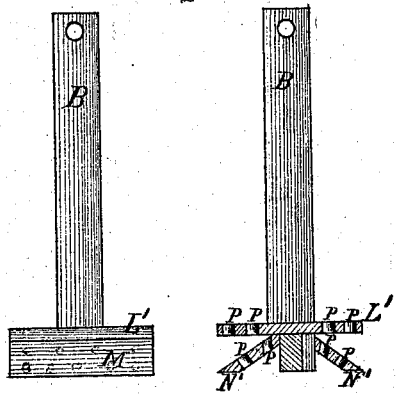

Figure 2, an elevation of the dashers removed from the other parts.

The present invention relates to an improvement in that class of churns which is provided with a dasher, operated by a lever placed above the lid; and Its nature consists in the novel means employed to regulate the length of stroke which the dashers are to have relative to each other, in combination with peculiarly-constructed dashers, as the whole is hereinafter described.

K represents the body of the churn, which will be better adapted to the working-device if it is made about one-half part longer than it is wide, and which is provided with a lid, J, shutting down closely on to the part K in the usual manner.

An adjustable support, G, is fastened to the lid J, by means of set-screws I I, put through slots H, which are made transversely through the support, near its ends, as shown at fig. 1.

To this support G is attached a vertical standard, C, for the purpose of receiving the pivot F, on which a lever, A, has an oscillating motion.

This lever A is provided with a slot, N, to receive the standard C and upper ends of dasher-rods B B, and it is provided with holes to receive the pivots D D, with which the rods and lever are connected, a centre-hole to receive the pivot F, and a hole, E, at each side of the centre-hole, to receive the pivot F, when one of the dashers, L', is to have a greater length of stroke than the other, as set forth under the head of operation.

Each dasher consists of a perforated cap, L', two inclined perforated agitators N N, boxed up by end-pieces M, fig. 2, and attached to a rod, B, which passes through an opening, L, in the lid J, and fastens to the pivot D, as stated.

Operation.

This arrangement is such, that if the ends are grasped with the hands, and given an oscillating motion, the dashers will have the usual vertical reciprocating motion, and agitate the cream in barrel or body K. To adjust the dashers for gathering butter, the pivot F should be removed, the set-screw I loosened, and the support J so moved toward either of the rods B, that the pin F may be put in one of the holes E. The screws I are then tightened, and the dashers are ready to operate.

By means of this construction and arrangement, one of the dashers will have a much greater length of stroke than the other; consequently butter is forced to one end of the barrel, where it receives only short, light strokes, from the dasher hung nearest to standard C, and, as a result, the butter will be speedily gathered into a lump, free from any salvey appearance.

Having thus described my invention,

What I claim, and desire to secure by Letters Patent of the United States, is—

The combination of the adjustable support G, standard C, lever A, dashers B L', and barrel K J, constructed and arranged to operate as described.

STEPHEN S. ULREY.

Witnesses:
DAVID MILLER,
W. F. DAILY.